Dec. 13, 1960
S. GODET ET AL
2,964,645
APPARATUS FOR PRODUCING SPIRAL MOTION
Filed Oct. 19, 1956
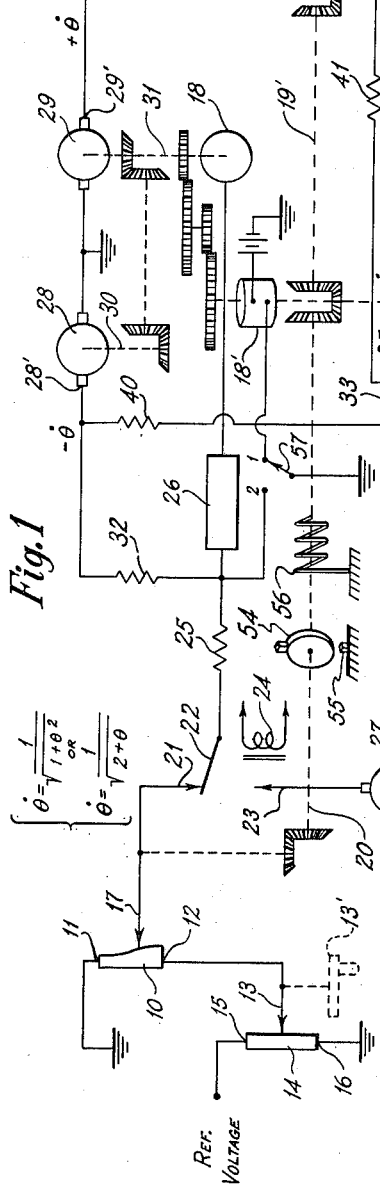
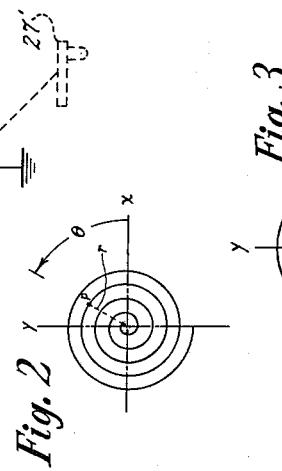
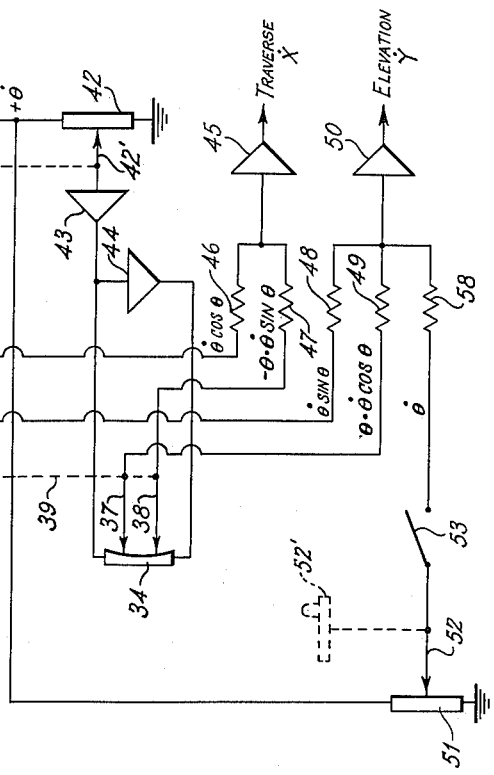
INVENTORS
SIDNEY GODET
RAWLEY D. MCCOY
BY
Burgess, Ryan & Hicks
Attorneys

2,964,645

APPARATUS FOR PRODUCING SPIRAL MOTION

Sidney Godet, Great Neck, and Rawley D. McCoy, Bronxville, N.Y., assignors to Reeves Instrument Corporation, New York, N.Y., a corporation of New York Filed Oct. 19, 1956, Ser. No. 616,999

12 Claims. (Cl. 307—23)

This invention relates to an electronic control system, and more specifically to novel and improved method and apparatus for moving an element to describe a predetermined spiral path under controlled conditions of speed and acceleration. The invention is particularly useful, among other things, for controlling radar antennas and the like for the purpose of providing concentrated search or acquisition patterns in localized areas.

An object of the invention resides in the provision of an improved apparatus for controlling the movement of a radar antenna to describe a predetermined path. Through an improved arrangement and coordination of elements, the acceleration of the radar beam along the scanning path can be controlled to secure either uniform acceleration or uniform velocity or a combination of both uniform acceleration and velocity as may be desired. Moreover, the scanning path may be distorted to compress the path along one side thereof when searching localized areas near the surface of the earth.

Still another object of the invention is an improved system for controlling the movement of radar antennas and the like to describe a spiral scanning path wherein the acceleration of the radar beam along the scanning path and the spacing between successive revolutions can be coordinated with the characteristics of the antenna to be controlled.

A further object of the invention is the provision of an automatic antenna control system for moving an antenna to scan a spiral path wherein the scan can be initiated from any point in space. Moreover, the antenna can be stopped at any point in the scan and manually operated to retrace or continue the scan, and the scanning speed can be varied both automatically and manually to any maximum value determined by the characteristics of the antenna or other element under control.

The above and other objects and advantages of this invention will become more apparent from the following description and accompanying drawings forming part of this application.

In the drawings:

Fig. 1 is a circuit diagram in block form illustrating one embodiment of the invention;

Fig. 2 shows a typical spiral path of a search antenna controlled by the apparatus of Fig. 1; and Fig. 3 is a modified spiral scan produced by equipment shown in Fig. 1.

In moving a radar antenna or other element to scan a spiral path as shown in Fig. 2, a constant angular velocity will produce an increasing peripheral velocity of the beam along the scanning path. In practical applications, it has been found that this procedure will exceed the mechanical capabilities of the equipment and the inertia of the antenna will prevent rapid interruption of a scan in order to retrace or search a particular portion of the scanning path manually. Moreover, it is generally desirable to give substantially equal emphasis to all portions of the path and it has been found that this can be attained by modifying the angular velocity so that the peripheral velocity along the spiral at any given instant is uniform. Furthermore, in certain applications, practical limitations of the equipment to be controlled prevent the attainment of a spiral scanning path having uniform peripheral velocity, because of the relatively high accelerations encountered. With the arrangement and coordination of elements of the invention, a scan having substantially uniform angular acceleration may be generated.

The embodiment of the invention shown in Fig. 1 in addition to providing means for effecting spiral scanning paths of a radar antenna having either uniform peripheral velocity or uniform acceleration, includes means for stopping the antenna at any point in the scanning path for manual control to retrace or advance the scanning path and for continuing the scanning path automatically after such interruptions. The attainment of these ends is accomplished broadly through the generation of two signals or voltages representing space rates in Cartesian coordinates that are varied to produce the desired spiral motion of an antenna.

Considering first the mathematical solution of the problem, the equation for a spiral, as illustrated in Fig. 2, customarily given in polar coordinates is:

$$r = K\theta \tag{1}$$

where $r$ = distance from the center to a point P on the spiral
$\theta$ = angular position of point P
$K$ = constant reverting to Cartesian coordinates $$X = r \cos \theta \tag{2}$$

$$Y = r \sin \theta \tag{3}$$

Substituting $K\theta$ for $r$ $$X = K\theta \cos \theta \tag{4}$$

$$Y = K\theta \sin \theta \tag{5}$$

Differentiating X and Y with respect to time as the variable $$\dot{X} = K\theta (\cos \theta - \theta \sin \theta) \tag{6}$$

and $$\dot{Y} = K\theta (\sin \theta + \theta \cos \theta) \tag{7}$$

where $$\dot{X} = \frac{dx}{dt};\ \dot{Y} = \frac{dy}{dt}\ \text{and}\ \dot{\theta} = \frac{d\theta}{dt}$$

The peripheral speed S along the spiral at any given instant is the vector sum of the rate of change of positions X and Y or $$S = \sqrt{\dot{X}^2 + \dot{Y}^2} \tag{8}$$

Substituting for $\dot{X}$ and $\dot{Y}$ $$S = K\dot{\theta}\sqrt{1 + \theta^2} \tag{9}$$

For constant peripheral velocity along the scanning path, the angular velocity $$\dot{\theta} = \frac{S}{K\sqrt{1+\theta^2}} \tag{10}$$

Under certain conditions it may be desired to maintain substantially uniform acceleration along the scanned path rather than uniform velocity. If $\alpha$ is the total acceleration, then $$\alpha = \sqrt{\ddot{X}^2 + \ddot{Y}^2} \tag{11}$$

In order to maintain $\alpha$ constant, it was found that a practical approximation of $\dot{\theta}$ is $$\dot{\theta} = \frac{C}{\sqrt{2+\theta}} \tag{12}$$

where $C$ = constant.

One form of the invention for producing voltages representing Cartesian coordinates for causing an antenna or other element to described spiral paths as shown in Figs. 2 and 3 is shown in Fig. 1. To produce two coordinate voltages that will cause the projected beam of an antenna to scan a spiral path, the Equations 6 and 7 are solved by the apparatus of Fig. 1 to produce $\dot{X}$ and $\dot{Y}$. The solution of these equations is dependent upon the generation of a voltage proportional to the derivative of $\theta$ with respect to time and having the desired rate of change in order to maintain either peripheral velocity or total acceleration substantially constant.

The generation of a voltage proportional to $\theta$ is attained by means of the functional potentiometer 10 having its upper terminal 11 connected to ground and its lower terminal 12 connected to the manually movable contact 13 of the potentiometer 14. A direct reference voltage is applied between the end terminals 15 and 16 of potentiometer 14. The magnitude of the voltage at movable contact 13 determines the speed at which the spiral scan is accomplished. The movable arm 17 of potentiometer 10 is automatically driven by a servomotor 18 through reduction gears and a magnetic clutch 18′ by means of a mechanical shaft represented by the broken line 20. The taper or rate of change of impedance of the potentiometer 10 determines the characteristics of the spiral scan, as for intsance constant peripheral velocity or constant total acceleration, or a sequence of one followed by the other. Thus, in order to maintain uniform peripheral velocity, the potentiometer 10 should be arranged to produce a voltage at its movable contact 17 proportional to the quantity $$\frac{1}{\sqrt{1+\theta^2}}$$

as shown in Equation 10. To attain substantially uniform acceleration, then Equation 12 would be used employing the quantity $$\frac{1}{\sqrt{2+\theta}}$$

The voltage developed at contact 17 of potentiometer 10 is fed through fixed contact 21 and movable contact 22 of the single-pole double-throw relay 24 and resistor 25 to the amplifier 26. The output of this amplifier drives the servomotor 18. For manual operation of motor 18, a manually operated D.C. generator 27 having a handwheel 27′ is connected to amplifier 26 by relay 24. Upon actuation of relay 24 at any point in the scan, contacts 22 and 23 will close causing the automatic scan to stop and providing manual retrace and advance of the scan by handwheel 27′.

The generation of positive and negative voltages corresponding to $\theta$ is accomplished by a pair of D.C. tachometers 28 and 29 mechanically coupled to the servomotor 18 as indicated by the broken lines 30 and 31. Tachometers 28 and 29 are connected to produce reversely polarized voltages at the output terminals 28′ and 29′. The potential appearing at terminal 28′ is fed back to the input of amplifier 26 through a series resistor 32 to control and regulate the operation of servomotor 18 so that its rotation will be governed accurately by the voltage applied to amplifier 26 from the relay contact 22.

The development of sine and cosine functions of $\theta$ to meet the requirements of Equations 6 and 7 is attained by a pair of D.C. resolvers 33 and 34, which may be sine-cosine potentiometers having movable contactors 35—36 and 37—38, respectively. The contactors are mechanically driven by the motor 18 through the reduction gears and the magnetic clutch 18′ as indicated by the broken line 39. Resolver 33 is connected through series resistors 40 and 41 to terminals 28′ and 29′ respectively of tachometers 28 and 29, and the output voltages at contactors 35 and 36 represent $\theta \cos \theta$ and $\theta \sin \theta$ respectively.

Resolver 34 is energized by the voltage from terminal 29′ of tachometer 29 as modified by the potentiometer 42. Potentiometer 42 is connected between terminal 29′ and ground, and the movable contactor 42′ thereof is mechanically coupled to the motor 18 through clutch 18′ as indicated by the broken lines 19 and 19′. The voltage at contactor 42′ is fed through an isolating amplifier 43 to one terminal of the resolver 34 and also through a phase reversing isolating amplifier 44 to the other resolver terminal. Resolver 34 produces output voltages on the contactors 37 and 38 thereof proportional to $\dot{\theta} \cdot \theta \cos \theta$ and $-\dot{\theta} \cdot \theta \sin \theta$.

To produce the transverse or $\dot{X}$ voltage, the voltage $\dot{\theta} \cos \theta$ from resolver terminal 35 and $-\dot{\theta} \cdot \theta \sin \theta$ from resolver terminal 38 are fed to the summing amplifier 45 through resistors 46 and 47 respectively. The elevation or $\dot{Y}$ voltage is obtained by applying the voltages $\dot{\theta} \sin \theta$ from resolver terminal 36 and $\dot{\theta} \cdot \theta \cos \theta$ from resolver terminal 37 through resistors 48 and 49 to the summing amplifier 50. The output voltages from amplifiers 45 and 50 represent the solutions of Equations 6 and 7.

The system illustrated in Fig. 1 is arranged to control an antenna to produce one complete spiral scan as $\theta$ varies from 0 to 30 radians. This corresponds to a spiral having approximately four and three-quarters revolutions, as illustrated in Fig. 2. During one complete spiral scan, the movable arm 17 of potentiometer 10 and the arm 42′ of potentiometer 42 are driven by shafts 19 and 20 over substantially their full range of travel. To limit the range of travel of arms 17 and 42′ and to stop the scan at the end of each spiral, a cam 54 attached to shaft 20 is driven against a limit stop 55, thereby limiting the rotation of shafts 19, 19′ and 20 to less than one revolution.

The number of revolutions in a complete spiral scan is determined by the number of revolutions of the movable contactors of resolvers 33 and 34 in one revolution of shafts 19, 19′, and 20. One revolution of the shafts of the resolvers 33 and 34 corresponds to a change in $\theta$ of 360 degrees. In Fig. 1, shaft 39 is geared to rotate at 5 times the speed of shafts 19, 19′, and 20.

At the end of each complete spiral scan, the shafts 19, 19′, 20, and 39 cease to rotate when the cam 54 is driven against limit 55. Servomotor 18 also ceases to drive tachometers 28 and 29 thereby causing the voltage $\dot{\theta}$ to drop to zero. This causes the output voltage $\dot{X}$ and $\dot{Y}$ from amplifiers 45 and 50 to drop to zero. An antenna being controlled by the system of Fig. 1 remains pointed in a fixed direction at the end of the spiral scan.

To begin another spiral scan, the shafts 19, 19′, 20, and 39 must be returned to their original positions. This is accomplished by the coil spring 56 surrounding shaft 20. During each spiral scan, coil spring 56 is brought under tension. Thus, at the end of each complete spiral scan the operator by moving the arm of switch 57 from position 1 to position 2 declutches the shafts 19, 19′, 20 and 39 from servomotor 18 and the coil spring 56 returns these latter shafts to their original position. The input to amplifier 26 is grounded in position 2 of switch 57 to prevent the servomotor 18 from being energized while the shafts are being returned to the original position. By returning switch 57 to position 1, a new spiral scan will be initiated. It should be observed that the new spiral scan begins where the old scan stopped, and an antenna under the control of the invention will search a new area, the center of which corresponds to the direction at which the antenna was pointing at the end of the preceding spiral scan.

The spacing between adjacent revolutions is selected, depending upon the characteristics of the antenna being controlled, so that a small overlap of the antenna beam occurs throughout the spiral scan to insure that a target within the area being scanned is detected. This spacing is determined by the values of resistors 46 through 49.

If during a particular spiral scan a target is detected, an operator may switch from the automatic mode of operation to the manual control of the antenna by energizing relay 24. In the manual mode of operation, the antenna may be arranged to search around its pointing direction by continuously turning the handwheel 27'. It should be noted that handwheel 27' may be rotated either clockwise or counter-clockwise to control the direction of scan.

The transverse voltage $\dot{X}$ and the elevation voltage $\dot{Y}$ are not applied directly to the servo amplifiers of the antenna system but are applied, for example, to the torquing gyros of a ship's stabilized antenna. These voltages $\dot{X}$ and $\dot{Y}$ are rate voltages and not displacement voltages. Thus, the servo system for positioning the antenna functions to integrate the voltages $\dot{X}$ and $\dot{Y}$ to cause the pointing direction of the antenna to describe a spiral path.

A convenient method of testing the control system of Fig. 1 is to apply the voltage $\dot{X}$ to an integrating circuit, and couple the integrated $\dot{X}$ voltage to the horizontal deflection plates of a cathode-ray oscilloscope having a long persistence cathode-ray tube screen. The voltage $\dot{Y}$ is similarly applied to an integrating circuit the output of which is coupled to the vertical deflection plates of the oscilloscope. Proper operation of the control system will cause a spiral trace to be produced upon the screen of the cathode-ray tube.

In certain instances it may be desirable for the antenna to scan a localized area in close proximity to the surface of the earth. However, the beam as it passes through the bottom portion of the spiral path will intersect the earth as the radius of the spiral increases. To attain maximum effectiveness from the antenna beam, the spiral may be distorted as shown in Fig. 3. This may be attained with the invention by feeding a voltage variable in accordance with $+\theta$ to the amplifier 50. The circuit for this purpose includes the potentiometer 51 connected between the output terminal 29' of the tachometer 29 and ground. The movable contactor 52 of potentiometer 51 is manually controlled by the handwheel 52' and is connected to the amplifier 50 through a control switch 53 and series resistor 58. Closure of switch 53 applies the auxiliary voltage $+\theta$ to the amplifier 50 and compresses the bottom of the spiral, as illustrated in Fig. 3. The degree of such compression may be controlled by the operation of potentiometer 51.

The invention described above constitutes a relatively compact and highly dependable system for the control of antennas, searchlights and other devices that are to be moved to describe a spiral. In addition, it affords a high degree of versatility in that the velocity of the scan can be modified throughout a wide range by adjustment of potentiometer 14 and by employing a potentiometer 10 having the desired characteristic curve.

The potentiometer 10 is not limited to the two functional characteristics illustrated in Fig. 1 but may possess a characteristic combining portions of the constant velocity response with the constant acceleration response. For example, it may be desirable to select a functional characteristic which produces a constant acceleration response at the start of the spiral scan and which produces a selected constant velocity response as soon after the start of the spiral scan as the antenna is capable of achieving the desired constant peripheral scanning velocity.

Both automatic and manual scanning control is provided and the configuration of the scan can be modified in any desired manner by inserting appropriate bias voltages to one or both amplifiers 45 and 50. Thus, while only the lower portion of each scan is compressed as shown in Fig. 3, it is possible to compress or expand any portion or portions thereof as may be desired.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

We claim:
1. An electrical computer comprising electro-mechanical means including a motor and at least two generators coupled therewith, at least one potentiometer mechanically coupled with said motor and having means for applying a source of voltage thereto, connections between said motor and potentiometer, said potentiometer and motor being coordinated to produce output voltages of opposite polarity from said generators variable in accordance with a function including a variable angle, a first resolver mechanically coupled with said motor and electrically connected with said generators to produce two voltages related to the product of the output voltage from said generators and the sine and cosine functions of said variable angle, voltage varying means mechanically coupled to said motor and electrically connected with at least one of said generators, a second resolver mechanically coupled with said motor and electrically connected with said voltage varying means for producing two voltages related to the product of the voltage from said voltage varying means and the sine and cosine functions of said variable angle, and summing means for algebraically combining the output voltages from said first and second resolvers to produce two variable voltages having a vector sum describing a spiral path about a point coincident with the vertex of said angle.

2. An electrical computer according to claim 1 including means for manually generating a voltage and means for disconnecting said potentiometer from said motor and applying said manually generated voltage thereto.

3. In a computer for providing output control voltages for controlling an object to scan a predetermined spiral path in space, the combination comprising shaft means whose angular position corresponds to the angular position of a vector to a point, the locus of which is to describe the predetermined spiral path, means varying the angular velocity of said shaft means inversely as a function of the angular position of the vector to the point describing the predetermined spiral path, means coupled to said shaft means for producing a voltage varying according to the angular position of said shaft means, and resolver means coupled to said shaft means and to said voltage producing means and being jointly responsive to the angular position of said shaft means and to said angular position voltage for producing an output voltage varying according to the product of the angular position of said shaft means and the sine of the angular position of said shaft means, said resolver means further producing another output voltage varying according to the product of the angular position of said shaft means and the cosine of the angular position of said shaft means.

4. The apparatus as defined in claim 3 wherein said means varying the angular velocity of said shaft means varies the angular velocity according to the function $$\frac{1}{\sqrt{1+\theta^2}}$$

where $\theta$ is the angular position of said shaft means.

5. The apparatus as defined in claim 3 wherein said means varying the angular velocity of said shaft means varies the angular velocity according to the function $$\frac{1}{\sqrt{2+\theta}}$$

where $\theta$ is the angular position of said shaft means.

6. In a computer for providing output control voltages for controlling an object to scan a predetermined spiral path in space, the combination comprising motor means having a shaft whose angular position corresponds to the angular position of a vector to a point the locus of which is to describe the predetermined spiral path, means energizing said motor means for varying the angular velocity of said shaft inversely as a function of the angular position of the vector to the point describing the predetermined spiral path, means coupled to the shaft of said motor means for producing a voltage varying according to the angular position of said shaft, and resolver means coupled to said shaft and to said voltage producing means for producing an output voltage varying according to the product of the angular position of said shaft and the sine of the angular position of said shaft, said resolver means further producing another output voltage varying according to the product of the angular position of said shaft and the cosine of the angular position of said shaft.

7. A computer for producing output control voltages for controlling an object to scan a predetermined spiral path in space, comprising in combination, shaft means whose angular position corresponds to the angular position of a vector to a point, the locus of which is to describe the predetermined spiral path, means coupled to said shaft means for varying the angular velocity of said shaft means inversely as a function of the angular position of the vector to the point describing the predetermined spiral path, means coupled to said shaft means for producing a voltage varying according to the angular velocity of said shaft means, first resolver means coupled to said shaft means and to said voltage producing means and being jointly responsive to the angular position of said shaft means and said velocity output voltage, multiplying means coupled to said shaft means and to said voltage producing means and being jointly responsive to the angular position of said shaft means and said velocity output voltage for producing an output voltage varying according to the product of said shaft position and said velocity output voltage, second resolver means coupled to said shaft means and to said multiplying means and being jointly responsive to the angular position of said shaft means and said product voltage, first combining means coupled to said first and second resolver means for producing a first output scan control voltage, and second combining means coupled to said first and second resolver means for producing a second output scan control voltage.

8. The computer as defined in claim 7 further comprising a voltage divider means coupled to said velocity voltage producing means, and means coupling a portion of said velocity output voltage from said voltage divider means to said second combining means.

9. In computer apparatus for producing output control voltages for controlling an object to scan a predetermined spiral path, the combination comprising shaft means whose angular position corresponds to the angular position of a vector to a point the locus of which is to describe the predetermined spiral path, servo means coupled to said shaft means for varying the angular velocity of said shaft means inversely proportional to a function of the angular position of said shaft means, means coupled to said shaft means for producing a velocity voltage whose magnitude varies according to the angular velocity of said shaft means, and resolver means coupled to said shaft means and to said voltage producing means, said resolver means producing a first output voltage varying according to the product of said velocity voltage and the sine of the angular position of said shaft means, said resolver means further producing a second output voltage varying according to the product of said velocity voltage and the cosine of the angular position of said shaft means.

10. The combination as defined by claim 9 further comprising multiplying means coupled to said shaft means and to said voltage producing means for providing a product voltage varying according to the product of said velocity voltage and the angular position of said shaft means, and second resolver means coupled to said shaft means and to said multiplying means for producing third and fourth output voltages, said third output voltage varying according to said product voltage multiplied by the sine of the angular position of said shaft means and said fourth output voltage varying according to said product voltage multiplied by the cosine of the angular position of said shaft means.

11. The combination as defined by claim 10 further comprising first summing means coupled to said first and second resolvers for combining said first output voltage and said fourth output voltage, and second summing means coupled to said first and second resolvers for combining said second output voltage and said third output voltage.

12. The combination as defined by claim 11 further comprising means coupling said voltage producing means to said second summing means, said coupling means coupling a portion of said velocity voltage to said second summing means.

References Cited in the file of this patent

UNITED STATES PATENTS

| | | |
|---|---|---|
| 2,556,972 | Murdick | June 12, 1951 |
| 2,617,982 | Holschuh | Nov. 11, 1952 |
| 2,660,722 | Ley | Nov. 24, 1953 |
| 2,776,396 | Gille et al. | Jan. 1, 1957 |
| 2,789,261 | Hoffmann | Apr. 16, 1957 |